(12) United States Patent
Möhler et al.

(10) Patent No.: US 6,681,138 B2
(45) Date of Patent: Jan. 20, 2004

(54) PROGRAMMABLE DEVICE FOR DISTRIBUTING ELECTRICAL CONTROL SIGNALS TO TECHNICAL EQUIPMENT

(75) Inventors: Harald Möhler, Nuremberg (DE); Christian Lenz, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/395,347

(22) Filed: Sep. 14, 1999

(65) Prior Publication Data

US 2003/0060908 A1 Mar. 27, 2003

Related U.S. Application Data

(63) Continuation of application No. PCT/DE98/00754, filed on Mar. 13, 1998.

(30) Foreign Application Priority Data

Mar. 14, 1997 (DE) .......................... 197 10 521

(51) Int. Cl.[7] .............................. G05B 11/01
(52) U.S. Cl. ..................... 700/17; 700/83; 345/965
(58) Field of Search ................. 700/17, 83; 345/965, 345/970

(56) References Cited

U.S. PATENT DOCUMENTS

| | | | |
|---|---|---|---|
| 5,168,441 A | * 12/1992 | Onarheim et al. | ............ 700/17 |
| 5,349,518 A | 9/1994 | Zifferer et al. | |
| 5,386,360 A | * 1/1995 | Wilson et al. | ................ 700/17 |
| 5,471,380 A | * 11/1995 | Itami et al. | .................... 700/17 |
| 5,551,053 A | 8/1996 | Nadolski et al. | |
| 5,598,521 A | * 1/1997 | Kilgore et al. | .............. 345/804 |

FOREIGN PATENT DOCUMENTS

| | | |
|---|---|---|
| DE | 4316291 A1 | 11/1994 |
| DE | 4438806 C1 | 3/1996 |
| DE | 19510466 A1 | 10/1996 |
| EP | 0531435 B1 | 3/1993 |
| EP | 0575148 A2 | 12/1993 |

OTHER PUBLICATIONS

Industrie–elekrik + electronik, 1985, No. 10, pp. 14–16.

Rueβ, Roland, "Sercos–Interface auch für Sensoren und Aktoren," *Elektronik*, V41, N20, Sep. 29, 1992, pp. 66–68.

Pinto, James J., ""Chicken–Brain" I/O—Architecture for "Truly" Distributed Control," *Advances in Instrumentation and Control*, V48, Part 2, pp. 829–841.

\* cited by examiner

*Primary Examiner*—Ramesh Patel
*Assistant Examiner*—Edward F. Gain
(74) *Attorney, Agent, or Firm*—Sughrue Mion, PLLC

(57) ABSTRACT

The programmable device (V) has terminal connections (610, 620) for electrically connecting the technical equipment (B1 . . . Bm), process signal channels (K1 . . . Km), which can be programmed depending on the application, for the electrical control signals, a display device (A) for showing the programmable process signal channels (K1 . . . Km) and the terminal connections (610, 620), graphics control equipment (M, T) for the virtual association of the process signal channels (K1 . . . Km) with the terminal connections (610, 620), and at least one processing unit (X1, X2) which, on the basis of the graphical association, produces a corresponding control link.

12 Claims, 3 Drawing Sheets

PROGRAMMABLE DEVICE FOR DISTRIBUTING ELECTRICAL CONTROL SIGNALS TO TECHNICAL EQUIPMENT

This is a Continuation of International Application PCT/DE98/00754, with an international filing date of Mar. 13, 1998, the disclosure of which is incorporated into this application by reference.

FIELD OF AND BACKGROUND OF THE INVENTION

The invention relates to new and useful improvements in automation technology. More particularly, the invention relates to a programmable device for distributing electrical control signals to technical equipment.

In automation technology, electronic control systems are used, in particular, for automating technical processes. In this respect, familiar electronic control systems have a central processing unit, particularly a programmable logic controller, and may have a so-called local peripheral for distributing, transmitting, receiving and/or processing electrical control signals. Technical equipment is then connected to the electronic control system by means of, e.g., so-called terminal blocks. Examples of such technical equipment include motors, valves, sensors and switches.

German Patent No. DE 44 38 806 C1 discloses a modular control system in which terminal blocks, which can be lined up on mounting rails, are provided for use in signal processing between field equipment and an internal bus line. This internal bus line can be coupled to a higher-level fieldbus system. The modular control system has fixed terminal blocks which can have an electronic module plugged onto them. The removable electronic module is used, in particular, for signal processing purposes and for coupling to a bus system which is connected to a central programmable logic controller.

A particular disadvantage is that the allocation of control signals to the terminal connections of the terminal block is inflexible. Once a terminal structure has been defined, it cannot be modified thereafter without a great deal of effort.

A further disadvantage is that the known terminal block has only unidirectional terminal inputs and outputs. These are usually designed as a separate terminal block for input signals and a separate terminal block for output signals. This requires a great deal of time and effort at the design and planning stage, since each control signal cable for a piece of technical equipment has to be physically split into inputs and outputs during design and planning.

Such known terminal blocks therefore have the disadvantage that they require complicated terminal allocation diagrams to be drawn up. These have a high potential for error at the design and planning stage, i.e. when the technical equipment is connected to the terminal connections.

OBJECTS OF THE INVENTION

It is therefore a first object of the invention to provide a device, for distributing electrical control signals to technical equipment, having more advantageous design and planning characteristics.

It is a further object of the invention to provide a device in which the allocation of control signals to the terminal connections is flexible and easily modified.

It is another object of the invention to provide a more efficient device with bi-directional use (e.g., input/output) terminals that avoids the need to physically split each control signal cable for each piece of technical equipment into inputs and outputs during the design and planning stage.

It is yet another object of the invention to provide a device that avoids the need for complicated terminal allocation diagrams to be drawn up at the design and planning stage, in order to reduce the potential for terminal wiring error.

SUMMARY OF THE INVENTION

According to one formulation of the invention, these and other objects are achieved by a programmable device for distributing electrical control signals to technical equipment, comprising:

a) terminal connections for electrically connecting the technical equipment;

b) programmable process signal channels for the electrical control signals, wherein the process signal channels are application-dependently programmable;

c) a display device having a graphics user interface, the graphics user interface comprising:
  c1) first graphics control fields for displaying the programmable process signal channels; and
  c2) second graphics control fields for displaying the terminal connections;

d) graphics control equipment for establishing an application-dependent graphical association between one of the first graphics control fields and one of the second graphics control fields; and e) at least one processing unit which, on the basis of the application-dependent graphical association, produces a control link such that the electrical control signals are transmitted via a corresponding process signal channel that is represented by the one first graphics control field and via a corresponding terminal connection that is represented by the second graphics control field.

The programmable device has programmable process signal channels, which are programmably and flexibly linked to terminal connections for routing electrical control signals to the technical equipment. The programmable device also has a display device that displays a graphics user interface, which in turn shows the programmable process signal channels and the terminal connections. This arrangement of the programmable device allows a user to graphically associate the programmable process signal channels with the terminal connections in order to establish a control link depending on the particular application of the device.

One advantage of the programmable device according to the invention for distributing electrical control signals to technical equipment is that graphics control equipment is used to create, on a graphics user interface, an application-dependent graphical association between terminal connections and process signal channels for electrical control signals. When this is done, the graphical association produces a corresponding control link for the relevant terminal connections and process signal channels.

A further advantage is that, during the design and planning of the electrical connection between the technical equipment and the terminal connections, steps can be taken to start programming the terminal allocation. In this respect, the graphics control equipment can be used to create a quick and clear application-dependent association, via the user interface, between input and output signal channels of a central processing unit and the corresponding terminal connections. In particular, this permits wiring based on colors or a number code, which is customary in design and planning; in particular, this means laying the signal lines using the so-called "color scheme" or "numbering". By associating signal lines and terminals by color, for example, it is possible to produce so-called "fixed wiring" in minimal amounts of time, without the need for wiring to be checked for correctness by additional, repeated, visual inspections.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
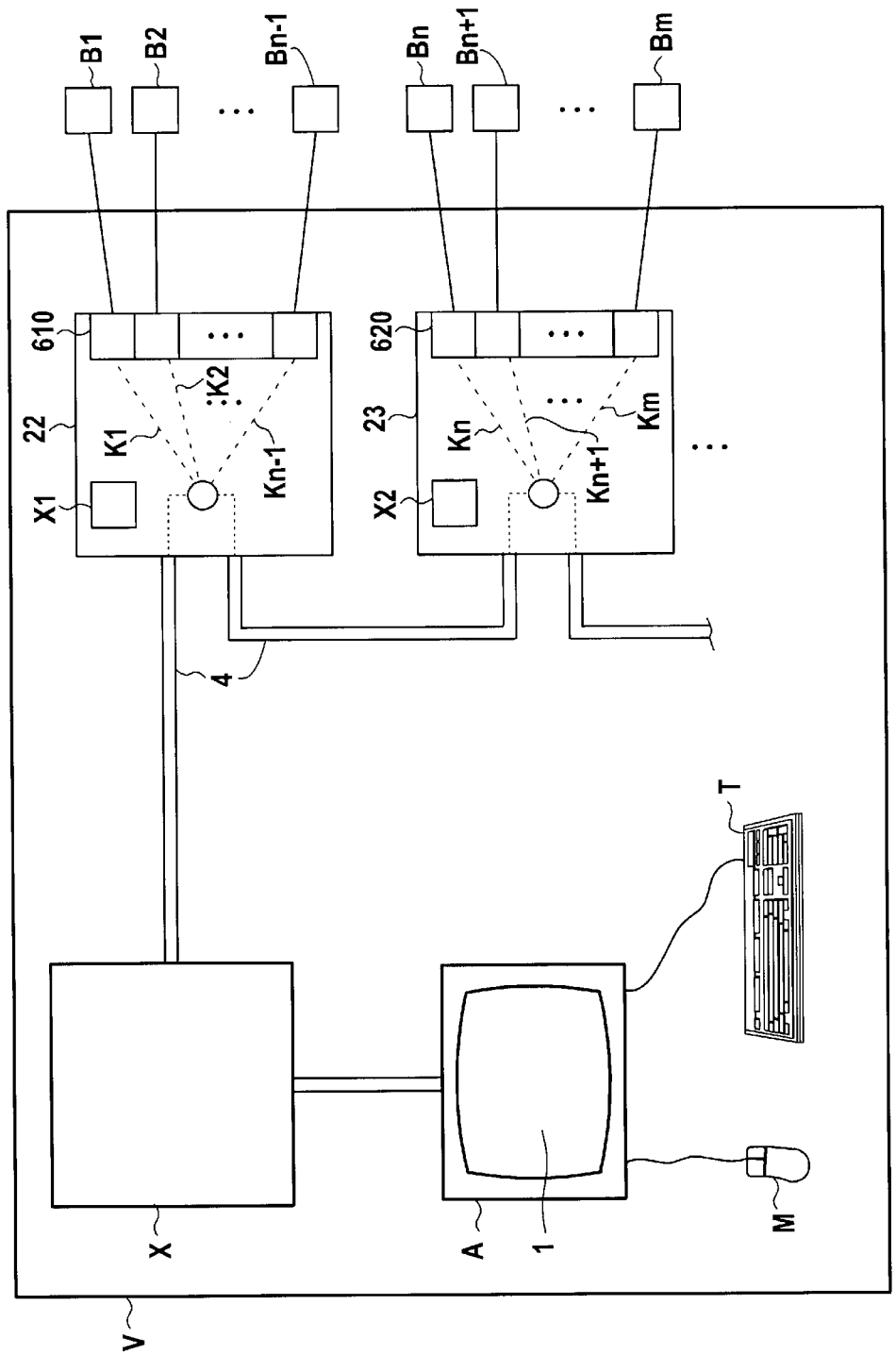
FIG. 1 shows, by way of example, a general structure for the programmable device according to the invention for distributing electrical control signals to technical equipment.

FIG. 1 shows, by way of example, a general structure for the programmable device V according to the invention for distributing electrical control signals to technical equipment. In this arrangement, the technical equipment is denoted by the reference symbols B1, B2, . . . , Bn−1, Bn, Bn+1, . . . , Bm. The programmable device V has terminal connections 610 and 620 for electrically connecting the technical equipment B1 . . . Bm. In addition, the programmable device V has process signal channels for the electrical control signals. These process signal channels can be programmed depending on the application desired and are shown in FIG. 1 by the reference symbols K1, K2, . . . , Kn−1, Kn, Kn+1, . . . , Km. A display device A for the programmable device V, including, for example, a computer monitor, is used to display a graphics user interface 1. The graphics user interface 1 is used, in particular, for displaying the programmable process signal channels K1 . . . Km and the terminal connections 610 and 620, and can be operated, in particular, using graphics control equipment M and/or T. This equipment can be in the form of a so-called computer mouse, a computer keyboard and/or a manual input device known in electrical data processing, for example. When a graphical association is created (on the user interface 1) between the displayed programmable process signal channels K1 . . . Km and the displayed terminal connections 610 and/or 620, a corresponding control link is produced by at least one processing unit X1 and/or X2.

In one embodiment of the programmable device according to the invention, at least one processing unit X1 or X2 is designed as a local connection module 22 or 23. In this case modules 22 and 23 have the terminal connections 610 and 620 for connecting technical equipment B1 . . . Bm and are connected to a central processing unit X via a data bus 4. The data bus 4 can therefore be used to feed electrical control signals from the central processing unit X to the technical equipment B1 . . . Bm and back again by means of the corresponding process signal channels K1 . . . Km and the terminal connections 610, 620. As a result, it is possible to produce a so-called 'local peripheral' having a central processing unit X and having the local connection modules 22 and 23 respectively arranged separately and, in particular, in the immediate vicinity of the corresponding technical equipment B1 . . . Bm. The central processing unit X is preferably a programmable logic controller, which is used to process the electrical control signals. The data bus 4 is advantageously in the form of a standard bus system, such as a PROFI-bus system or a CAN-bus system.

Figure 2:
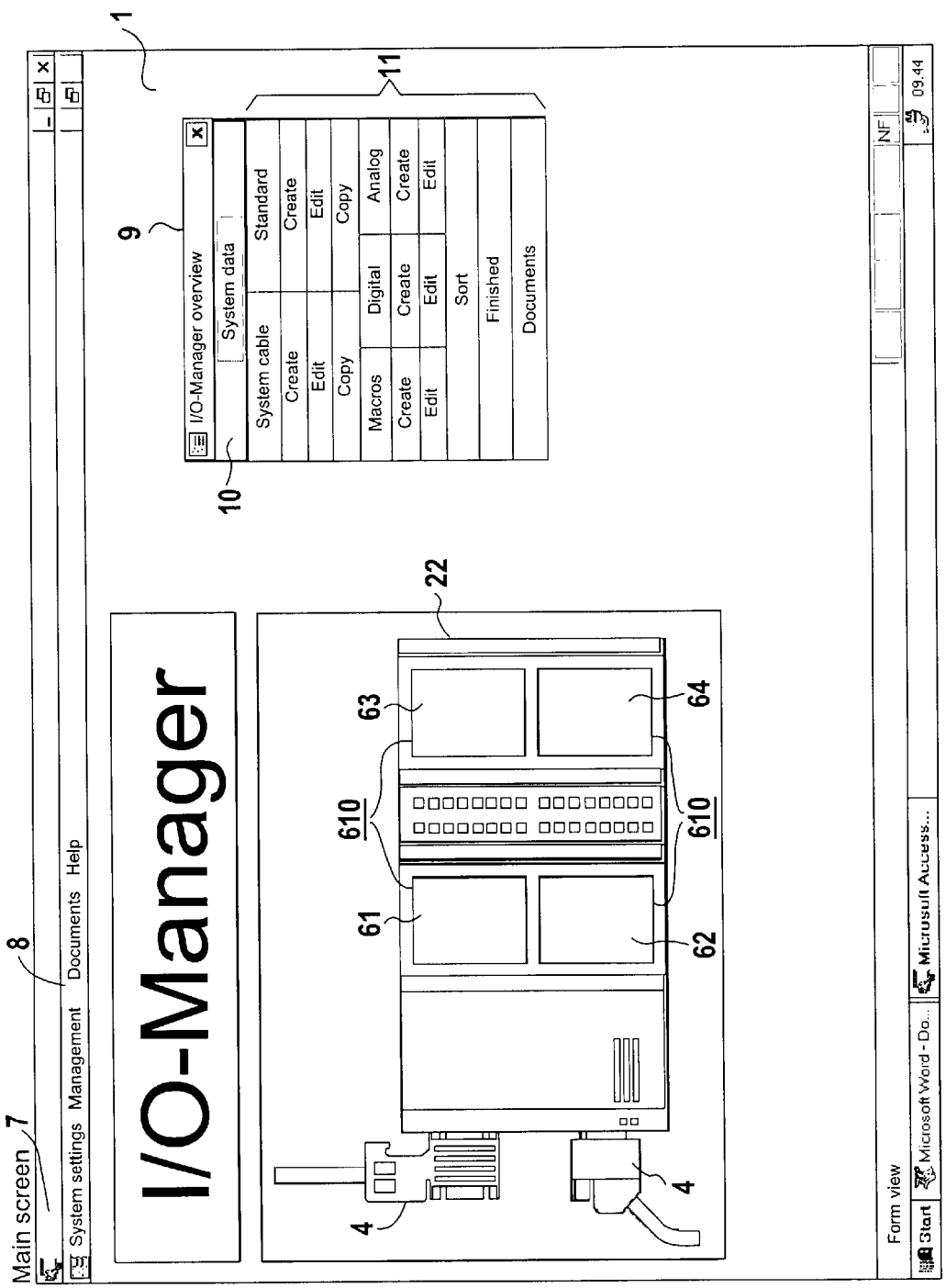
FIG. 2 shows, by way of example, a first view of the graphics user interface displayed on the display device.

FIG. 2 shows, by way of example, a first view of the graphics user interface 1 displayed on the display device A. This view shows that the graphics user interface 1 has a program and data display bar 7, as well as a menu bar 8 for controlling the graphics user interface 1. In addition, for control purposes, the user interface 1 has a control window 9, with a 'system data' graphical button 10, which is shown activated, by way of example, as well as other graphical buttons 11 which are used for the 'virtual' design and planning of the programmable device according to the invention.

Furthermore, by way of example, the user interface 1 shown in FIG. 2 contains an image of a local connection module 22 which is connected to the data bus 4 and has terminal connections 610 in the form of four terminal panels 61, 62, 63 and 64, for example. These panels can each have a multiplicity of individual terminal connections, for example eight in each case, for connecting technical equipment B1 . . . Bm.

Figure 3:
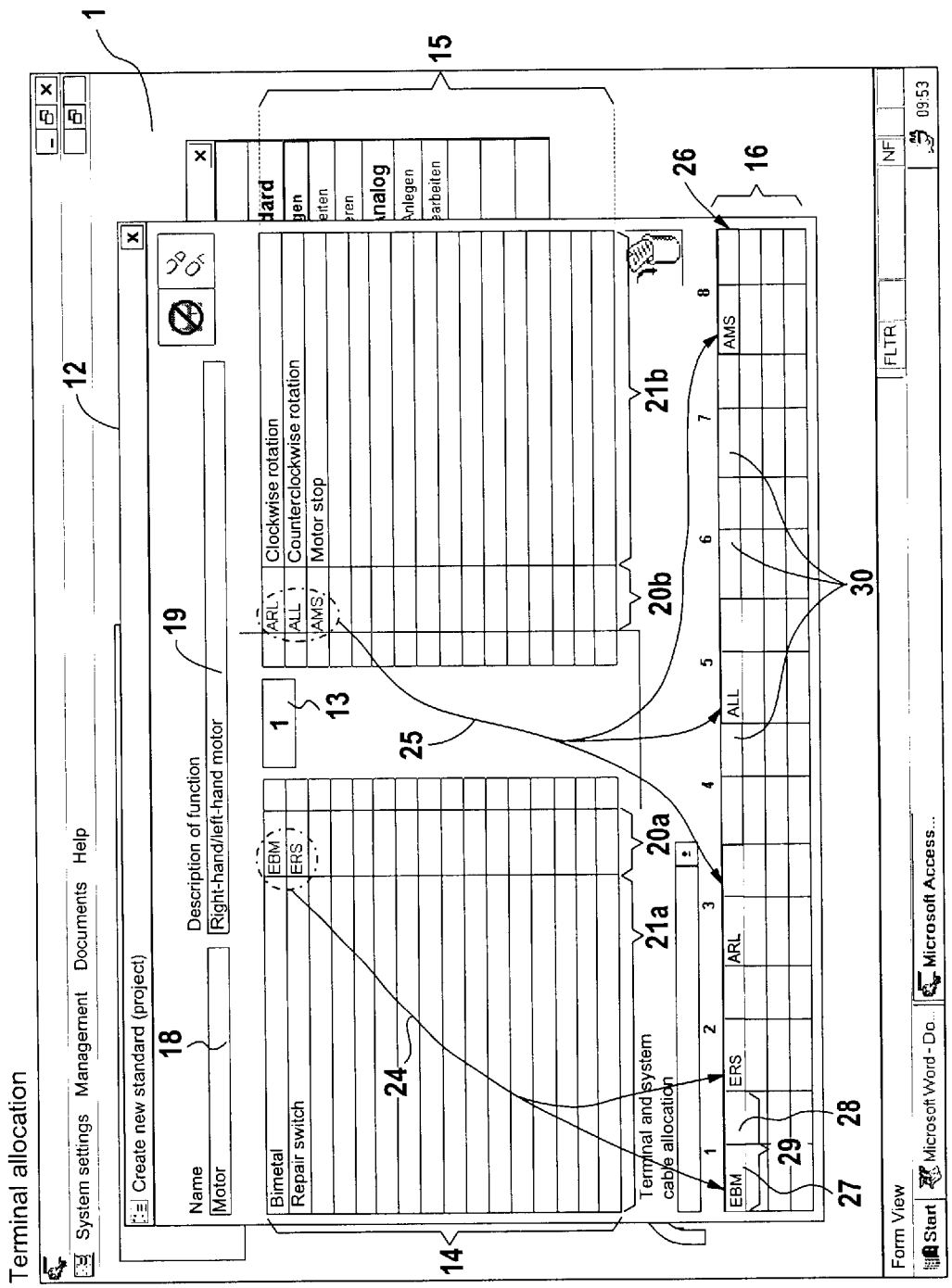
FIG. 3 shows, by way of example, a further view of the graphics user interface having first and second graphics control fields for showing the programmable process signal channels and the terminal connections.

In addition, FIG. 3 shows a further exemplary view of the graphics user interface 1. According to the invention, this has first graphics control fields 14 and 15 for showing the programmable process signal channels K1 . . . Km shown in FIG. 1, and second graphics control fields 16 for showing the terminal connections 610 and 620 shown in FIG. 1. An advantage of this is that each of the programmable process signal channels K1 . . . Km and each of the terminal connections 610 and 620 has in each case at least one first graphics control field 14, 15 and in each case at least one second graphics control field 16 associated with it. Using the graphics control equipment M and/or T shown in FIG. 1, it is possible to create an application-dependent graphical association between a first graphics control field 14, 15 and a second graphics control field 16. On the basis of the graphical association, the processing unit X1 and/or X2 produces a control link, e.g., through software and logic circuitry, such that the electrical control signals can be transmitted via the process signal channel K1 . . . Km, which is represented by the first graphics control field 14 and/or 15, and via the terminal connection 610 and/or 620, which is represented by the second graphics control field 16.

In one embodiment of the invention, shown in FIG. 3, a separate process window 12 is associated with each piece of technical equipment B1 . . . Bm on the graphics user interface 1, said process window having at least the first and second graphics control fields 14, 15 and 16. In particular, a graphics field with the reference symbol 13 can contain a serial number, for example the number '1' in this case. The graphical association, in particular, for a specific type of equipment B1 . . . Bm can thus be stored under this serial number in an electronic library. Hence, advantageously, the graphical associations for different types of equipment B1 . . . Bm need be created and stored only once. When designing and planning equipment B1 . . . Bm, stored graphical associations for the equipment B1 . . . Bm required can then be recalled in the course of application-dependent programming of the device according to the invention. In the example shown in FIG. 3, the separate process window 12 contains a graphics input field 18 for the name of the appropriate equipment, for example 'Motor' in this case, and a further graphics input field 19 containing a description of the function of the equipment, for example 'Right-hand/left-hand motor' in this case.

Advantageously, as shown in FIG. 3, the graphics user interface 1 has, according to a further preferred embodiment of the invention, a graphics input area 14 containing those first graphics control fields 20a and 21a which are linked to the corresponding terminal connections 610 and 620 as input signal channels during graphical association 24 with the second graphics control fields 16. In addition, the graphics user interface 1 advantageously has a graphics output area 15 containing those first graphics control fields 20b and 21b which are linked to the corresponding terminal connections 610 and 620 as output signal channels during graphical association 25 with the second graphics control fields 16.

In this respect, the illustration in FIG. 3 shows, by way of example, a number of first and second graphics control fields with the reference symbols 14, 15 and 16 and arranged in tabular form, i.e. aligned next to one another in rows and columns. In this case, each row of the input and output areas, denoted by the reference symbols 14 and 15, respectively, shows a programmed process signal channel K1 . . . Km. Each process signal channel K1 . . . Km has, by way of example, two of the first graphics control fields associated with it in each case. The fields of columns 20a and 20b, respectively, may thereby, each be used to enter a long description, for example, and the fields of columns 21a and 21b, respectively, may each be used to enter a short description, for example.

Advantageously, the graphics user interface 1 has a graphics terminal area (labeled 16) containing the second graphics control fields 16 positioned to correspond approximately to the arrangement of the terminal connections 610 and 620. In this case, in the example shown in FIG. 3, the graphics terminal area for the second graphics control fields 16 is divided into four rows of eight columns, said four rows corresponding approximately to the arrangement of the terminal panels 61, 62, 63 and 64, which are shown in FIG. 2.

In the example shown in FIG. 3, a graphical association 24 and 25 is created between first graphics control fields 14 and 15, representing input and output signal channels, and the second graphics control fields 16. The second graphics control fields 16 are arranged in the row with reference symbol 26 and columns one to eight. The graphical associations 24 and 25 can advantageously be created using a computer mouse M, employing a so-called 'drag & drop' technique. In particular, a whole row can be allocated for a piece of technical equipment B1 . . . Bm, so that an entire terminal panel 61, 62, 63 or 64 is occupied, for example. Using the graphics control equipment, in particular, second graphics control fields 16 can then also be graphically allocated, as shown by reference symbol 30, such that, although there is no association of first graphics control fields 14 and 15, the processing unit X1 or X2 blocks off (i.e., reserves) the terminal connections represented, as a control action.

In a further embodiment of the invention, a respective color and/or number code 28 can be associated, on the graphics user interface 1, with the terminal connections 610 and 620 represented by the second graphics control fields 16. In the example shown in FIG. 3, two respective second graphics control fields are associated with each of the terminal connections 610 and 620. By way of example, the double field 29 used to show a single terminal connection has a first field 27 containing the short description of the graphically associated first graphics control field, and a second field 28 containing a color and/or number code 28. The color and/or number code 28 is used particularly for design and planning when laying signal lines using the so-called "color scheme" or "numbering".

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A programmable device for distributing electrical control signals to technical equipment, comprising:
   a) terminal connections for electrically connecting to the technical equipment;
   b) programmable process signal channels each individually operable to bi-directionally carry a respective electrical control signal either to or from a respective terminal connection, wherein each of said process signal channels is application-dependently programmable to operate as either an input or an output;
   c) a display device having a graphics user interface, said graphics user interface comprising:
      c1) first graphics control fields for displaying said programmable process signal channels; and
      c2) second graphics control fields for displaying said terminal connections;
   d) graphics control equipment for establishing an application-dependent graphical association between a selected one of said first graphics control fields and a selected one of said second graphics control fields;
   e) at least one processing unit which, on the basis of the application-dependent graphical association, produces a control link that selectively establishes one of two available physical connections between one of said programmable process signal channels that is represented by said selected first graphics control field, and one of said terminal connections that is represented by said selected second graphics control field, wherein the physical connection is defined to be either an input or an output based on the graphical association;
   f) a central processing unit operable to control said graphics control equipment; and
   g) a data bus for connecting between said central processing unit and said at least one processing unit,
   wherein said at least one processing unit is a local connection module comprising said terminal connections for flexibly connecting said technical equipment and said at least one processing unit is software programmable to generate the control link based on the application dependent graphical association.

2. The programmable device as claimed in claim 1, wherein said graphics user interface further comprises:
   separate process windows associated with each respective piece of the technical equipment, each of said separate process windows having at least any of said first and second graphics control fields that are used to show those of said process signal channels and those of said terminal connections that are linked to said respective piece of technical equipment.

3. The programmable device as claimed in claim 1, wherein said graphics user interface further comprises:
   a) a graphics input area containing selected ones of said first graphics control fields that are linked, during the application-dependent graphical associations with selected ones of said second graphics control fields, to corresponding ones of said terminal connections as input signal channels; and b) a graphics output area containing selected ones of said first graphics control fields that are linked, during the application-dependent graphical associations with selected ones of said second graphics control fields, to corresponding ones of said terminal connections as output signal channels.

4. The programmable device as claimed in claim 1, further comprising:

a graphics terminal area containing said second graphics control fields positioned to correspond approximately to a physical arrangement of said terminal connections.

5. The programmable device as claimed in claim 1, wherein said graphics user interface allows at least one of a respective color code and a respective number code to be associated with said terminal connections, which are represented by said second graphics control fields.

6. The programmable device as claimed in claim 1, wherein said central processing unit is a programmable logic controller that is used to process said electrical control signals.

7. A method of distributing electrical control signals to technical equipment via a programmable device, comprising:

a) electrically connecting the technical equipment to terminal connections of the programmable device;

b) displaying programmable process signal channels, which distribute the electrical control signals, as first graphics control fields via a graphics user interface on a display device;

c) displaying the terminal connections as second graphics control fields via the graphics user interface on a display device;

d) application-dependently programming one of the programmable process signal channels by establishing an application-dependent graphical association, via graphics control equipment, between a selected one of the first graphics control fields and a selected one of the second graphics control fields;

producing a control link, based on the application-dependent graphical association, in at least one processing unit such that the electrical control signals are transmitted via the one of said programmable process signal channels that is represented by the selected first graphics control field, and via one of the terminal connections that is represented by the selected second graphics control field;

f) processing the electrical control signals via a central processing unit; and g) connecting the central processing unit and the at least one processing unit via a data bus; wherein the at least one processing unit is a local connection module comprising the terminal connections for connecting the technical equipment and said at least one processing unit is software programmed to generate a control link based on the application dependent graphical association.

8. The method as claimed in claim 7, further comprising:

associating separate process windows with each respective piece of the technical equipment, each of the separate process windows having at least any of the first and second graphics control fields that are used to show those of the process signal channels and those of the terminal connections that are linked to the respective piece of technical equipment.

9. The method as claimed in claim 7, further comprising:

a) displaying a graphics input area, via the graphics user interface, containing selected ones of the first graphics control fields that are linked, during the application-dependent graphical associations with selected ones of the second graphics control fields, to corresponding ones of the terminal connections as input signal channels; and b) displaying a graphics output area, via the graphics user interface, containing selected ones of the first graphics control fields that are linked, during the application-dependent graphical associations with selected ones of the second graphics control fields, to corresponding terminal connections as output signal channels.

10. The method as claimed in claim 7, further comprising:

displaying a graphics terminal area, via the graphics user interface, containing the second graphics control fields positioned to correspond approximately to a physical arrangement of the terminal connections.

11. The method as claimed in claim 7, wherein the graphics user interface allows at least one of a respective color code and a respective number code to be associated with the terminal connections, which are represented by the second graphics control fields.

12. A programmable device for distributing electrical control signals to technical equipment, comprising:

a) terminal connections for electrically connecting the technical equipment;

b) programmable process signal channels for the electrical control signals, wherein said process signal channels are application-dependently programmable;

c) a display device having a graphics user interface, said graphics user interface comprising:
 c1) first graphics control fields for displaying said programmable process signal channels; and
 c2) second graphics control fields for displaying said terminal connections;

d) graphics control equipment for establishing an application-dependent graphical association between a selected one of said first graphics control fields and a selected one of said second graphics control fields;

e) at least one processing unit which, on the basis of the application-dependent graphical association, produces a control link such that the electrical control signals are transmitted via one of said programmable process signal channels that is represented by said selected first graphics control field, and via one of said terminal connections that is represented by said selected second graphics control field;

f) a central processing unit; and g) a data bus for connecting between said central processing unit and said at least one processing unit, wherein said at least one processing unit is a local connection module comprising said terminal connections for connecting said technical equipment and said at least one processing unit is software programmed to generate a control link based on the application dependent graphical association and wherein further, said central processing unit is a programmable logic controller used to process said electrical control signals.

* * * * *